United States Patent
Veidhes et al.

(10) Patent No.: US 10,613,403 B2
(45) Date of Patent: Apr. 7, 2020

(54) DISPLAY DEVICE AND METHOD FOR MANUFACTURING DISPLAY DEVICE

(71) Applicant: Samsung Display Co., Ltd., Yongin-Si, Gyeonggi-Do (KR)

(72) Inventors: Basrur Veidhes, Yongin-si (KR); Chang Il Tae, Seoul (KR); Sae Ron Park, Gimhae-si (KR); Jin Joo Ha, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/259,670

(22) Filed: Jan. 28, 2019

(65) Prior Publication Data
US 2019/0331949 A1 Oct. 31, 2019

(30) Foreign Application Priority Data

Apr. 26, 2018 (KR) .......................... 10-2018-0048782

(51) Int. Cl.
| G02F 1/1339 | (2006.01) |
| G02F 1/1368 | (2006.01) |
| G02F 1/1337 | (2006.01) |
| G02F 1/1362 | (2006.01) |

(52) U.S. Cl.
CPC .......... *G02F 1/1368* (2013.01); *G02F 1/1339* (2013.01); *G02F 1/133723* (2013.01); *G02F 2001/136222* (2013.01)

(58) Field of Classification Search
None
See application file for complete search history.

(56) References Cited

U.S. PATENT DOCUMENTS

| 6,734,943 | B2 | 5/2004 | Noiri |
| 6,774,972 | B2 * | 8/2004 | Park ...................... G02F 1/1345 349/153 |
| 7,050,130 | B2 | 5/2006 | Sohn et al. |
| 7,580,104 | B2 * | 8/2009 | Komeno ............... G02F 1/1337 349/123 |
| 7,639,334 | B2 * | 12/2009 | Iwato ................ G02F 1/133711 349/138 |
| 7,880,846 | B2 * | 2/2011 | Motomatsu ........... G02F 1/1337 349/123 |

(Continued)

FOREIGN PATENT DOCUMENTS

| KR | 10-1107165 B1 | 1/2012 |
| KR | 10-2013-0080360 A | 7/2013 |
| KR | 10-2013-0142784 A | 12/2013 |

*Primary Examiner* — James A Dudek
(74) *Attorney, Agent, or Firm* — Innovation Counsel LLP

(57) ABSTRACT

Disclosed herein are a display device and a method for fabricating the same.
A display device is provided. The display device comprises a display panel having a display area and a non-display area disposed outside the display area, the display panel comprising a first substrate and a second substrate; a seal pattern disposed around the non-display area and attaching the first substrate and the second substrate together; a first dam pattern disposed between the seal pattern and the display area and having a first height; a second dam pattern disposed between the first dam pattern and the seal pattern; an organic layer covering the non-display area at least partially; and a first alignment layer disposed on the organic layer, wherein the first height ranges from 3.6 μm to 5.2 μm.

20 Claims, 15 Drawing Sheets

(56) References Cited

U.S. PATENT DOCUMENTS

| | | | |
|---|---|---|---|
| 7,961,282 B2* | 6/2011 | Iwato | G02F 1/133711 349/123 |
| 8,233,119 B2* | 7/2012 | Gotoh | G02F 1/133514 349/106 |
| 8,287,209 B2 | 10/2012 | Feldman et al. | |
| 8,497,971 B2* | 7/2013 | Nagami | G02F 1/1339 349/153 |
| 8,514,356 B2* | 8/2013 | Shiromoto | G02F 1/133753 349/123 |
| 8,885,127 B2* | 11/2014 | Kanzaki | H01L 33/005 349/122 |
| 8,913,221 B2* | 12/2014 | Moriwaki | G02F 1/136286 349/138 |
| 8,999,487 B2 | 4/2015 | Berg et al. | |
| 9,151,998 B2* | 10/2015 | Jung | G02F 1/133788 |
| 9,188,813 B2* | 11/2015 | Shih | G02F 1/1339 |
| 9,207,494 B2* | 12/2015 | Lee | G02F 1/1337 |
| 9,213,201 B2* | 12/2015 | Jung | G02F 1/133723 |
| 9,360,699 B2* | 6/2016 | Park | G02F 1/133514 |
| 9,360,709 B2* | 6/2016 | Kunimatsu | G02F 1/133345 |
| 9,448,441 B2* | 9/2016 | Moriwaki | G02F 1/1337 |
| 9,507,211 B2* | 11/2016 | Tomioka | G02F 1/133788 |
| 9,529,224 B2 | 12/2016 | Kwak et al. | |
| 9,851,606 B2* | 12/2017 | Cha | G02F 1/1339 |
| 10,197,858 B2* | 2/2019 | Kojima | G02F 1/133345 |
| 10,303,003 B2* | 5/2019 | Shiromoto | G02F 1/133753 |
| 2003/0123015 A1* | 7/2003 | Park | G02F 1/1345 349/149 |
| 2008/0018848 A1* | 1/2008 | Iwato | G02F 1/133711 349/149 |
| 2008/0137022 A1* | 6/2008 | Komeno | G02F 1/1337 349/153 |
| 2008/0252835 A1* | 10/2008 | Motomatsu | G02F 1/1337 349/129 |
| 2009/0289260 A1* | 11/2009 | Sonoda | G02F 1/13394 257/72 |
| 2011/0013125 A1* | 1/2011 | Lee | G02F 1/133711 349/106 |
| 2011/0255041 A1* | 10/2011 | Inoue | G02F 1/133723 349/123 |
| 2012/0300163 A1* | 11/2012 | Moriwaki | G02F 1/1337 349/123 |
| 2013/0329155 A1 | 12/2013 | Kwak et al. | |
| 2014/0063431 A1* | 3/2014 | Shih | G02F 1/1339 349/153 |
| 2015/0062512 A1* | 3/2015 | Park | G02F 1/1337 349/123 |
| 2015/0131041 A1* | 5/2015 | Moriwaki | G02F 1/1337 349/106 |
| 2015/0185516 A1* | 7/2015 | Lee | G02F 1/1339 349/110 |
| 2015/0192816 A1* | 7/2015 | Shih | G02F 1/1339 349/42 |
| 2016/0077376 A1* | 3/2016 | Lee | G02F 1/133512 349/106 |
| 2016/0077383 A1* | 3/2016 | Lee | G02F 1/133723 349/43 |
| 2016/0116771 A1* | 4/2016 | Shiromoto | G02F 1/133753 257/72 |
| 2016/0116772 A1* | 4/2016 | Cha | G02F 1/1339 349/123 |
| 2017/0017109 A1* | 1/2017 | Park | G02F 1/133512 |
| 2017/0059904 A1* | 3/2017 | Kim | G02F 1/1339 |
| 2017/0090226 A1* | 3/2017 | Oh | G02F 1/1337 |
| 2017/0110477 A1* | 4/2017 | Han | H05K 999/99 |
| 2017/0123244 A1* | 5/2017 | Oh | G02F 1/133345 |
| 2017/0199431 A1* | 7/2017 | Kim | G02F 1/1339 |
| 2017/0261785 A1* | 9/2017 | Nishino | G02F 1/1339 |
| 2018/0031889 A1* | 2/2018 | Kim | G02F 1/1339 |
| 2018/0164617 A1* | 6/2018 | Shiromoto | G02F 1/133753 |
| 2018/0217422 A1* | 8/2018 | Kojima | G02F 1/13394 |
| 2018/0217423 A1* | 8/2018 | Suzuki | G02F 1/1337 |
| 2018/0364506 A1* | 12/2018 | Kao | G02F 1/133514 |
| 2019/0137805 A1* | 5/2019 | Huang | G02F 1/13394 |
| 2019/0212593 A1* | 7/2019 | Chen | G02F 1/13394 |
| 2019/0331949 A1* | 10/2019 | Veidhes | G02F 1/1368 |

* cited by examiner

DISPLAY DEVICE AND METHOD FOR MANUFACTURING DISPLAY DEVICE

This application claims priority to Korean Patent Application No. 10-2018-0048782 filed on Apr. 26, 2018 in the Korean Intellectual Property Office, the disclosure of which is incorporated herein by reference in its entirety.

BACKGROUND

1. Field of the Disclosure

The present disclosure relates to a display device, and a method for manufacturing a display device.

2. Description of the Related Art

Display devices become more and more important as multimedia technology evolves. Accordingly, a variety of types of display devices such as liquid-crystal display (LCD) devices and organic light-emitting display (OLED) devices are currently used.

Among display devices, an LCD device is one of the most broadly used flat panel display devices. An LCD device is composed of two substrates on which electrodes for generating electric field such as pixel electrodes and common electrodes are formed, and a liquid-crystal layer interposed between the two substrates. Voltage is applied to the electrodes for electric field to form electric field in the liquid-crystal layer, such that the orientation of the liquid crystals contained in the liquid-crystal layer is aligned and the polarization of incident light is controlled, to display images.

SUMMARY

Aspects of the present disclosure provide a display device capable of preventing an alignment layer from overflowing.

Aspects of the present disclosure also provide a method for manufacturing a display device capable of preventing an alignment layer from overflowing.

These and other aspects, embodiments and advantages of the present disclosure will become immediately apparent to those of ordinary skill in the art upon review of the Detailed Description and Claims to follow.

According to an aspect of the present disclosure, there is provided a display device including: a display panel having a display area and a non-display area disposed outside the display area, the display panel comprising a first substrate and a second substrate; a seal pattern disposed around the non-display area and attaching the first substrate and the second substrate together; a first dam pattern disposed between the seal pattern and the display area and having a first height; a second dam pattern disposed between the first dam pattern and the seal pattern; an organic layer covering the non-display area at least partially; and a first alignment layer disposed on the organic layer, wherein the first height ranges from 3.6 μm to 5.2 μm.

The display device may further include: a first trench formed between the first dam pattern and the display area and having a bottom face and side walls extended upward from the bottom face.

The side walls and the bottom face may be formed with the organic layer.

The first dam pattern may include a first dummy color pattern and the organic layer covering the first dummy color pattern, and a thickness of a portion of the organic layer as the bottom face may be different from a thickness of a portion of the organic layer covering the first dummy color pattern.

The side walls may be formed with the organic layer, while the bottom face may be made of an inorganic insulating material.

The first alignment layer may come in contact with the bottom face.

The display device may further include: a second trench formed between the first dam pattern and the second dam pattern.

The first dam pattern may include at least one dummy color filter.

The first dam pattern may further include a stack of dummy color filters having different colors, and a cover electrode covering the dummy color filters.

The first dam pattern may include a first dummy color filter and a second dummy color filter that have different colors, and the first height may range from 3.7 μm to 3.9 μm.

The first dam pattern may further include a third dummy color filter having a different color from the colors of the first dummy color filter and the second dummy color filter and stacked thereon, and the first height may range from 5.0 μm to 5.2 μm.

The dummy color filters may be stacked on one another in a stepwise fashion and have a step difference.

According to another aspect of the present disclosure, there is provided a method for manufacturing a display device, including: preparing a first substrate defining thereon a display area and a non-display area disposed outside the display area, the first substrate comprising a gate insulating layer and a passivation layer; forming a first dam pattern and a second dam pattern in the non-display area; forming an organic layer in the non-display area; forming a first alignment layer on the organic layer; and attaching the first substrate and a second substrate facing the first substrate together by using a seal pattern, wherein the first dam pattern has a first height, and the first height ranges from 3.6 μm to 5.2 μm.

The method may further include: forming a first trench between the first dam pattern and the display area.

The forming the first trench may include etching the organic layer using a photomask having an open portion and a light-blocking portion.

The first trench may further include a bottom face and side walls extended upward from the bottom face, the first dam pattern may include a first dummy color filter and the organic layer covering the first dummy color filter, and a thickness of a portion of the organic layer as the bottom face may be different from a thickness of a portion of the organic layer covering the first dummy color pattern.

The forming the first dam pattern and the second dam pattern in the non-display area may include: stacking two or more dummy color filters; and forming a cover electrode on the stack of dummy color filters.

The first dam pattern may include a first dummy color filter and a second dummy color filter that have different colors, and the first height may range from 3.7 μm to 3.9 μm.

The first dam pattern may further include a third dummy color filter having a different color from the colors of the first dummy color filter and the second dummy color filter and stacked thereon, and the first height may range from 5.0 μm to 5.2 μm.

The dummy color filters may be stacked on one another in a stepwise fashion and have a step difference.

Particulars in the exemplary embodiments of the present disclosure will be described in the detail description with reference to the accompanying drawings.

According to exemplary embodiments of the present disclosure, it is possible to prevent an alignment layer from flowing over to a non-display area to reach to a seal pattern.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
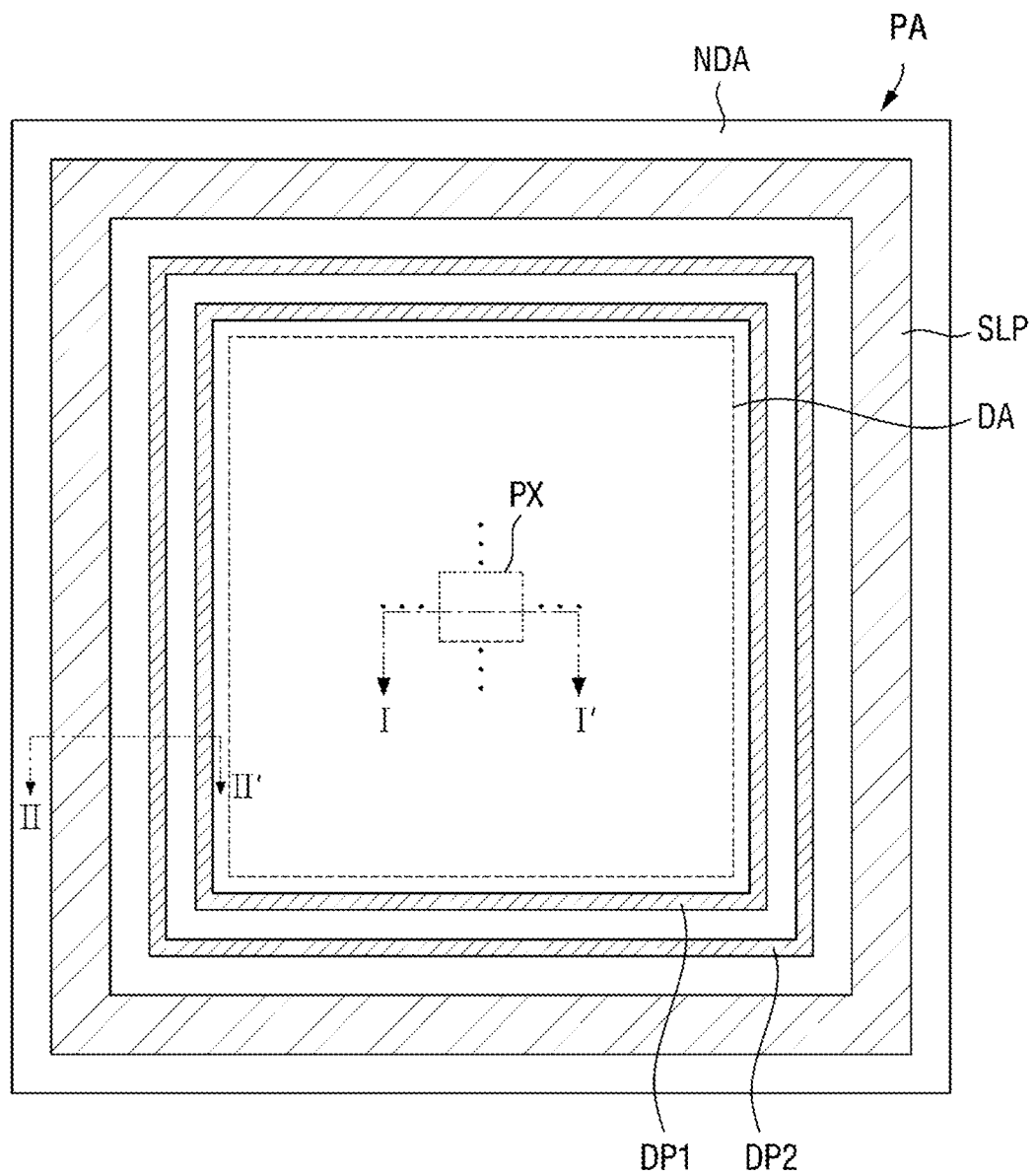
FIG. 1 is a layout view of a display device according to an exemplary embodiment of the present disclosure.

The advantages and features of the inventive concept and methods for achieving the advantages and features will be apparent by referring to the embodiments to be described in detail with reference to the accompanying drawings. However, the inventive concept is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the inventive concept, and the inventive concept is only defined within the scope of the appended claims.

Where an element is described as being related to another element such as being "on" another element or "located on" a different layer or a layer, includes both a case where an element is located directly on another element or a layer and a case where an element is located on another element via another layer or still another element. In contrast, where an element is described as being is related to another element such as being "directly on" another element or "located directly on" a different layer or a layer, indicates a case where an element is located on another element or a layer with no intervening element or layer therebetween.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Throughout the specification, the same reference numerals are used for the same or similar parts.

Hereinafter, exemplary embodiments of the present disclosure will be described in detail with reference to the accompanying drawings.

Figure 2:
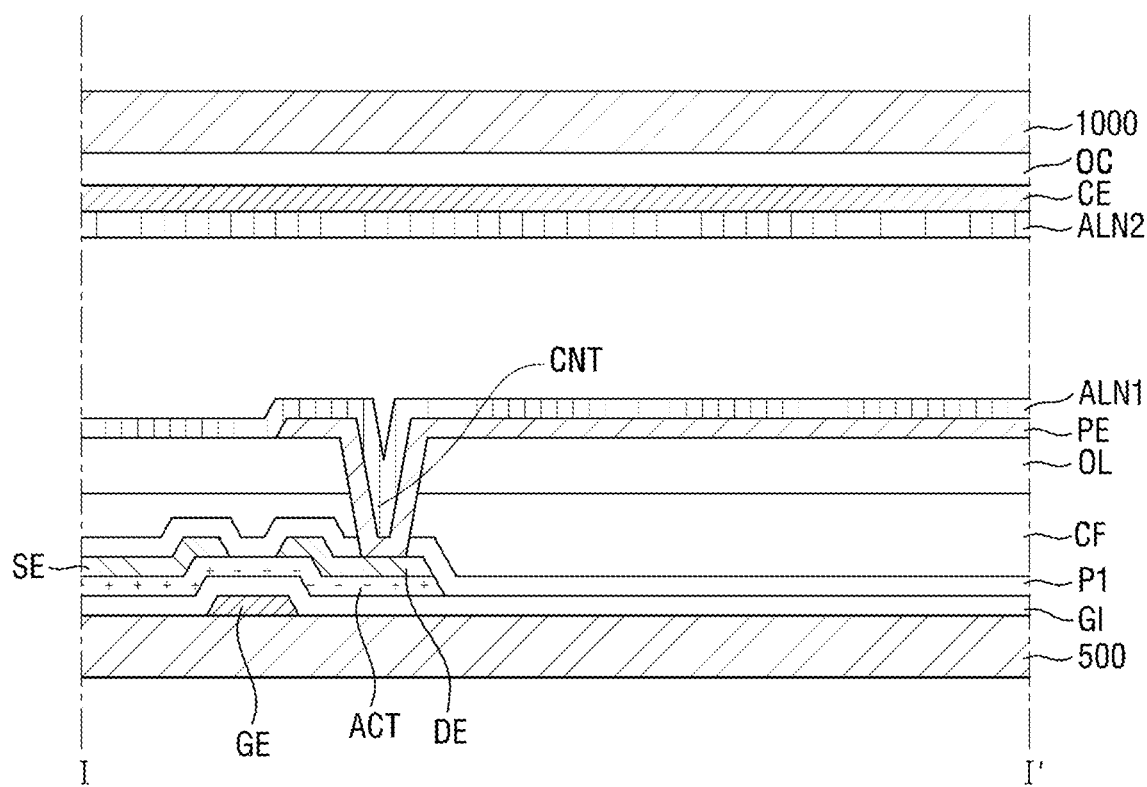
FIG. 2 is a cross-sectional view taken along line I-I' of FIG. 1.
Figure 3:
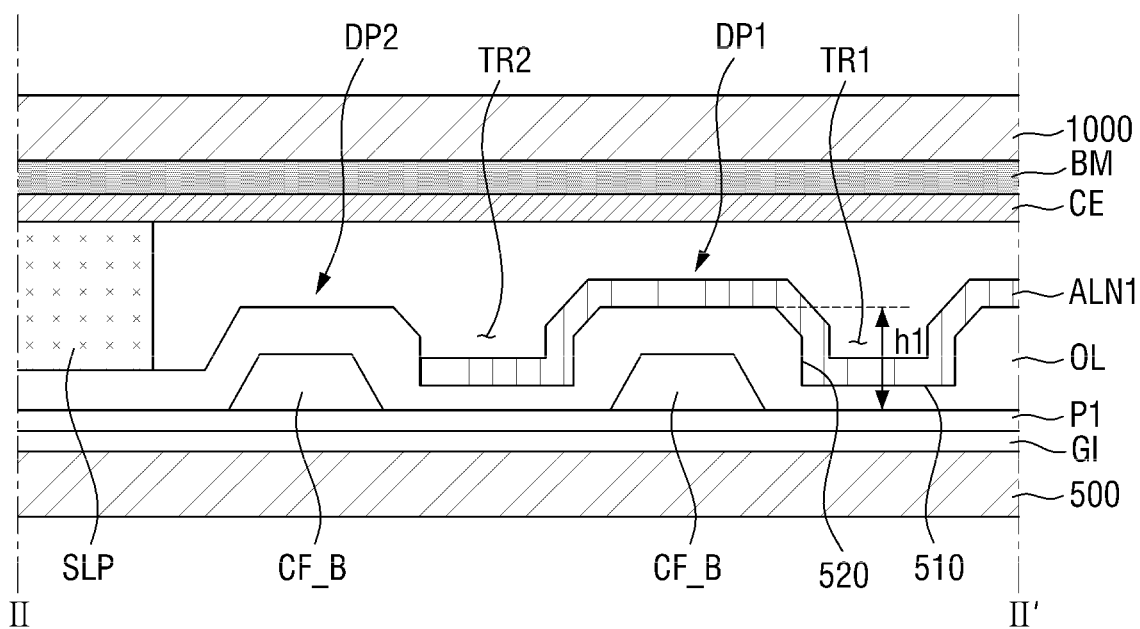
FIG. 3 is a cross-sectional view taken along line II-II' of FIG. 1.

FIG. 1 is a layout view of a display device according to an exemplary embodiment of the present disclosure. FIG. 2 is a cross-sectional view taken along line I-I' of FIG. 1. FIG. 3 is a cross-sectional view taken along line II-II' of FIG. 1.

Referring to FIGS. 1 to 3, a display device according to an exemplary embodiment of the present disclosure includes a display panel PA, a seal pattern SLP, a first dam pattern DP1, a second dam pattern DP2, and an organic layer OL.

On the display panel PA, a display area DA and a non-display area NDA may be defined. The display area DA refers to the area of the display device where an image is displayed. The non-display area NDA refers to the area of the display device where a variety of types of signal lines for allowing images to be displayed in the display area DA are disposed. A plurality of pixels PX for generating an image may be disposed in the display area DA. The non-display area NDA may surround the display area DA, for example. Although the non-display area NDA is shown as surrounding the display area DA in FIG. 1, this is merely illustrative. In another exemplary embodiment, the non-display area NDA may be disposed adjacent to only one side or the other side of the display area DA or may be disposed adjacent to either side of the display area DA separately.

Hereinafter, the cross-sectional structure of a pixel PX will be described with reference to FIG. 2.

Referring to FIG. 2, the pixel PX may include a first substrate 500 and a second substrate 1000 facing each other.

The first substrate 500 may be an insulating substrate. In an exemplary embodiment, the first substrate 500 may be made of a material that is resistant to heat and is transparent. For example, the first substrate 500 may be made of a material containing plastic or glass.

A gate electrode GE may be disposed on the first substrate 500. The gate electrode GE may be extended from a gate line (not shown) and accordingly may receive a gate signal.

In an exemplary embodiment, the gate electrode GE may include at least one of: an aluminum-based metal including an aluminum alloy; a silver (Ag)-based metal including a silver alloy; a copper (Cu)-based metal including a copper alloy; a molybdenum (Mo)-based metal including a molybdenum alloy; chrome (Cr); titanium (Ti); and tantalum (Ta). It is to be noted that the material of the gate electrode GE is not limited to those listed above. For example, other metals or polymer materials may be used as the material of the gate electrode GE to meet the requirements of a display device to be implemented.

In an exemplary embodiment, the gate electrode GE may be made up of a single layer, for example. It is, however, to be understood that the gate electrode GE may be made up of a double-layer, a triple-layer or multi-layer.

A gate insulating layer GI may be disposed on the gate electrode GE. The gate insulating layer GI may cover the gate electrode GE and may be formed throughout the entire surface of the first substrate 500.

The gate insulating layer GI may be formed by mixing one or more materials selected from the group consisting of: an inorganic insulating material such as silicon oxide (SiOx) and silicon nitride (SiNx); and an organic insulating material such as benzocyclobutene (BCB), an acryl-based material and polyimide. It is to be understood that the material of the gate insulating layer GI is not limited to those listed above.

A semiconductor pattern layer ACT may be disposed on the gate insulating layer GI.

The semiconductor pattern layer ACT may include amorphous silicon or polycrystalline silicon. It is to be understood that the material of the semiconductor pattern layer ACT is not limited thereto but may include oxide semiconductor.

The semiconductor pattern layer ACT may have a variety of shapes such as an island or a line. An ohmic contact layer (not shown) may be disposed on the semiconductor pattern layer ACT, which is highly doped with an n-type impurity. The ohmic contact layer may overlap with the semiconductor pattern layer ACT partially or completely. It is to be noted that the ohmic contact layer may be eliminated in an exemplary embodiment where the semiconductor pattern layer ACT includes an oxide semiconductor.

When the semiconductor pattern layer ACT is an oxide semiconductor, the semiconductor pattern layer ACT may include zinc oxide (ZnO). In addition, the semiconductor pattern layer ACT may be doped with one or more ions selected from the group consisting of: gallium (Ga), indium (In), stannum (Sn), zirconium (Zr), hafnium (Hf), cadmium (Cd), silver (Ag), copper (Cu), germanium (Ge), gadolinium (Gd), titanium (Ti), and vanadium (V) may be doped. For example, the semiconductor pattern layer ACT, which is an oxide semiconductor, may include one or more selected from the group consisting of: ZnO, ZnGaO, ZnInO, ZnSnO, GaInZnO, CdO, InO, GaO, SnO, AgO, CuO, GeO, GdO, HfO, TiZnO, InGaZnO and InTiZnO. It is to be understood that the above-listed compounds are merely illustrative and the type of oxide semiconductors are not limited thereto.

A source electrode SE and a drain electrode DE may be disposed on the semiconductor pattern layer ACT.

The source electrode SE may branch off from a data line (not shown) and may be extended to the top of the semiconductor pattern layer ACT.

The drain electrode DE and the source electrode SE may be spaced apart from each other and may be symmetric with respect to the gate electrode GE. The drain electrode DE may be in contact with and electrically connected to a pixel electrode PE to be described later.

The source electrode SE and the drain electrode DE may be made up of a single layer or multiple layers made of nickel (Ni), cobalt (Co), titan (Ti), silver (Ag), copper (Cu), molybdenum (Mo), aluminum (Al), beryllium (Be), niobium (Nb), gold (Au), iron (Fe), selenium (Se), tantalum (Ta), or the like. In addition, the material of the source electrode SE and the drain electrode DE may include an alloy formed by adding at least one element selected from the group consisting of titanium (Ti), zirconium (Zr), tungsten (W), tantalum (Ta), niobium (Nb), platinum (Pt), hafnium (Hf), oxygen (O) and nitrogen (N) to the metals.

Although FIG. 2 shows a single pixel having a single thin-film transistor, those skilled in the art would understand that the present disclosure is not limited thereto. In other exemplary embodiments, a single pixel may include more than one thin-film transistors. When a plurality of thin-film transistors is disposed in a single pixel, the pixel may be divided into a plurality of domains, each corresponding to the respective thin-film transistors.

A passivation layer P1 may be disposed on the source electrode SE, the drain electrode DE, the semiconductor pattern layer ACT, and the gate insulating layer GI. The passivation layer P1 may be formed of an inorganic insulating material. For example, the inorganic insulating material may include at least one selected from the group consisting of: silicon oxide, silicon nitride, silicon oxynitride, aluminum oxynitride, titanium oxynitride, zirconium oxynitride, hafnium oxynitride, tantalum oxynitride and tungsten oxynitride.

On the passivation layer P1, a color filter CF may be disposed. The color filter layer CF may include at least one color filter selected from the group consisting of a blue color filter, a green color filter and a red color filter. In an exemplary embodiment, the blue color filter, the green color filter and the red color filter may have different heights.

The organic layer OL may be disposed on the color filter CF. In an exemplary embodiment, the organic layer OL may be made of an organic insulating material having photosensitivity. The kind of the organic insulating material is not particularly limited herein.

The organic layer OL has a certain thickness and thus can function as a planarization layer.

The display device according to the exemplary embodiment may include a contact hole CNT.

The contact hole CNT may be formed by penetrating through the organic layer OL, the color filter CF and the passivation layer P1 so that a part of the upper surface of the drain electrode DE is exposed.

The pixel electrode PE may be disposed on the organic layer OL. The pixel electrode PE comes in contact with the drain electrode DE through the contact hole CNT so that the pixel electrode PE can be electrically connected to the drain electrode DE.

In an exemplary embodiment, the pixel electrode PE may be made of a transparent conductor such as indium tin oxide (ITO) and indium zinc oxide (IZO), or a reflective conductor such as aluminum.

A first alignment layer ALN1 may be disposed on the pixel electrode PE and the organic layer OL. The first alignment layer ALN1 is for initially aligning liquid-crystal molecules in a liquid-crystal layer (not shown) disposed between the first substrate 500 and the second substrate 1000. The first alignment layer ALN1 may include a polymer material in which one of the decomposition, dimerization, and isomerization takes place when it is irradiated with light (e.g., ultraviolet (UV) or laser). In addition, the first alignment layer ALN1 may be made of a polymer in which a reactive mesogen is polymerized.

In an exemplary embodiment, the first alignment layer ALN1 may include polyimide (PI).

The second substrate 1000 may be disposed such that it faces the first substrate 500.

The second substrate 1000 may be an insulating substrate. In an exemplary embodiment, the second substrate 1000 may be made of a material that is resistant to heat and is transparent. For example, the second substrate 1000 may be made of a material containing plastic or glass.

An overcoat layer OC may be disposed on the second substrate 1000. The overcoat layer OC may be made of a material containing an organic or inorganic insulating material. It is to be noted that the overcoat layer OC may be eliminated in other implementations.

A common electrode CE may be formed on the overcoat layer OC. The common electrode CE may be an unpatterned, single sheet electrode. A common voltage may be applied to the common electrode CE, so that the orientation of liquid crystals between the first substrate 500 and the second substrate 1000 may be controlled by the electrical field formed between the common electrode CE and the pixel electrode PE.

A second alignment layer ALN2 may be disposed on the common electrode CE. The second alignment layer ALN2 is for initially aligning liquid-crystal molecules in a liquid-crystal layer disposed between the first substrate 500 and the second substrate 1000. The second alignment layer ALN2 may include a polymer material in which one of the decomposition, dimerization, and isomerization takes place when it is irradiated with light (e.g., ultraviolet (UV) or laser). In addition, the second alignment layer ALN2 may be made of a polymer in which a reactive mesogen is polymerized.

Next, the non-display area NDA will be described with reference to FIG. 3.

The gate insulating layer GI may be disposed on the first substrate 500 of the non-display area NDA. The gate insulating layer GI may be substantially identical to the gate insulating layer GI formed in the display area DA. It is, however, to be understood that the present disclosure is not limited thereto. A separate insulating layer different from the gate insulating layer GI in the display area DA may be formed on the first substrate 500.

The passivation layer P1 may be formed on the gate insulating layer GI. The passivation layer P1 may be made of an inorganic insulating material. For example, the inorganic insulating material may include at least one selected from the group consisting of: silicon oxide, silicon nitride, silicon oxynitride, aluminum oxynitride, titanium oxynitride, zirconium oxynitride, hafnium oxynitride, tantalum oxynitride and tungsten oxynitride.

First dummy color filters CF_B may be disposed on the passivation layer P1. In an exemplary embodiment, the first dummy color filters CF_B may be blue color filters. It is, however, to be understood that the present disclosure is not limited thereto. The first dummy color filters CF_B may have one of red, blue and green colors.

In an exemplary embodiment, two first dummy color filters CF_B may be spaced apart from each other as shown in FIG. 3.

In addition, in an exemplary embodiment, since the first dummy color filters CF_B form a first dam pattern DP1 and a second dam pattern DP2, they may surround the display area DA at least partially, as shown in FIG. 1.

The organic layer OL may be disposed on the first dummy color filter CF_B. In an exemplary embodiment, the organic layer OL may fully cover the first dummy color filter CF_B. In an exemplary embodiment, the first dummy color filter CF_B and the organic layer OL overlapping the first dummy color filter CF_B may form the first dam pattern DP1 and the second dam pattern DP2.

A first height h1 of the first dam pattern DP1 may be defined as the distance from the upper surface of the passivation layer P1 to the top of the first dam pattern DP1. In an exemplary embodiment, the height of the first dam pattern DP1 may range from 3.6 μm to 5.2 μm.

The second dam pattern DP2 may have substantially the same shape as the first dam pattern DP1. In an exemplary embodiment, the height of the second dam pattern DP2 may range from 3.6 μm to 5.2 μm, like the first dam pattern DP1.

In an exemplary embodiment, the height of the first dam pattern DP1 may be substantially equal to the height of the second dam pattern DP2. It is, however, to be understood that the present disclosure is not limited thereto. In other exemplary embodiments, the height of the first dam pattern DP1 may be different from the height of the second dam pattern DP2.

Referring to FIG. 1, the first dam pattern DP1 may be disposed on the outer side of the display area DA to surround the edges of the display area DA.

The second dam pattern DP2 may be spaced apart from the first dam pattern DP1 and may be disposed on the outer side of the first dam pattern DP1 so as to surround the outer periphery of the second dam pattern DP2.

The seal pattern SLP may be disposed on the outer side of the second dam pattern DP2. The seal pattern SLP may attach the first substrate 500 and the second substrate 1000 together. The seal pattern SLP may be disposed in the non-display area NDA such that it surrounds the display area DA. In an exemplary embodiment where the display area DA has a quadrangular shape, the seal pattern SLP may be disposed such that it surrounds the four sides of the display area DA.

In an exemplary embodiment, the seal pattern SLP may at least partially overlap with the organic layer OL.

In the example shown in FIG. 3, the seal pattern SLP is completely overlapped with the organic layer OL. As the seal pattern SLP attaches the first substrate 500 and the second substrate 1000 together, it requires the adhesive property. If the seal pattern SLP is overlapped with the inorganic layer or the first alignment layer ALN1, the adhesive property may be deteriorated. In order to prevent the adhesive property of the seal pattern SLP, the first dam pattern DP1 and the second dam pattern DP2 can prevent that the first alignment layer ALN1 of the display area DA flows over to the seal pattern SLP.

In order to suppress the first alignment layer ALN1 from flowing over to the first dam pattern DP1 and/or the second dam pattern DP2, each of the first dam pattern DP1 and the second dam pattern DP2 is required to have the first height h1. That is to say, when the height of the first dam pattern DP1 and/or the second dam pattern DP2 ranges from 3.6 μm to 5.2 μm, it is possible to effectively prevent the overflow of the first alignment layer ALN1.

In an exemplary embodiment, the display device may include a first trench TR1 and a second trench TR2 formed by recessing the organic layer OL.

In an exemplary embodiment, the first trench TR1 may be formed between the display area DA and the first dam pattern DP1.

The first trench TR1 may include a bottom face 510 and side walls 520 extending upward from the bottom face 510.

The thickness of a portion of the organic layer OL where the first trench TR1 is formed may be different from the thickness of a portion of the organic layer OL where the first trench TR1 is not formed.

For example, the thickness of the portion of the organic layer where the bottom face 510 is formed may range from 0.09 μm to 0.11 μm. On the other hand, the thickness of the portion of the organic layer OL where the first trench TR1 is not formed, e.g., the portion of the organic layer OL formed on the upper surface of the first dummy color filter CF_B may range from 0.9 μm to 1.1 μm.

In other words, the thickness of the portion of the organic layer OL where the first trench TR1 is formed may be different from the thickness of the portion of the organic layer OL where the first trench TR1 is not formed.

The second trench TR2 may be disposed between the first dam pattern DP1 and the second dam pattern DP2.

The shape of the second trench TR2 may be substantially the same as the first dam pattern DP1.

Specifically, the second trench TR2 may include a bottom face 510 and sidewalls 520 extending upward from the bottom face 510 as well.

In addition, the thickness of the portion of the organic layer OL where the bottom face 510 is formed may be smaller than the thickness of the portion of the organic layer OL where the bottom face 510 is not formed.

As described above, once the first trench TR1 and/or the second trench TR2 are formed, a sharp slope is made in the vicinity of the first dam pattern DP1 and the second dam pattern DP2, such that a deeper accommodating space is formed. Such an accommodating space can suppress the first alignment layer ALN1 from flowing over to the first dam pattern DP1 and/or the second dam pattern DP2.

The first alignment layer ALN1 may be disposed on the organic layer OL.

In the example shown in FIG. 3, the first alignment layer ALN1 extends to the bottom face 510 of the first dam pattern DP1. It is, however, to be understood that the present disclosure is not limited thereto. The first alignment layer ALN1 may be extended beyond the first dam pattern DP1 to the bottom face 510 or the side wall 520 of the second dam pattern DP2. It is to be noted that the first alignment layer ALN1 still cannot completely go over the second dam pattern DP2.

As described above, the seal pattern SLP may attach the first substrate 500 and the second substrate 1000 together. In an exemplary embodiment, a common electrode CE and a black matrix BM may be disposed on the second substrate 1000 in the non-display area NDA. The common electrode CE in the non-display area NDA may be formed by extending the common electrode CE formed in the display area DA.

The black matrix BM may at least partially cover the non-display area NDA. In an exemplary embodiment, the black matrix BM may block light coming from the outside or may prevent light from scattering in the device. To this end, the black matrix BM may be made of a photosensitive resin containing a black pigment. It is to be understood that the material of the black matrix BM is not limited thereto. Any material may be used for the material of the black matrix as long as it can block light.

Hereinafter, a display device according to another exemplary embodiment of the present disclosure will be described. In the following description, the same or similar elements will be denoted by the same or similar reference numerals, and redundant descriptions will be omitted or briefly described.

Figure 4:
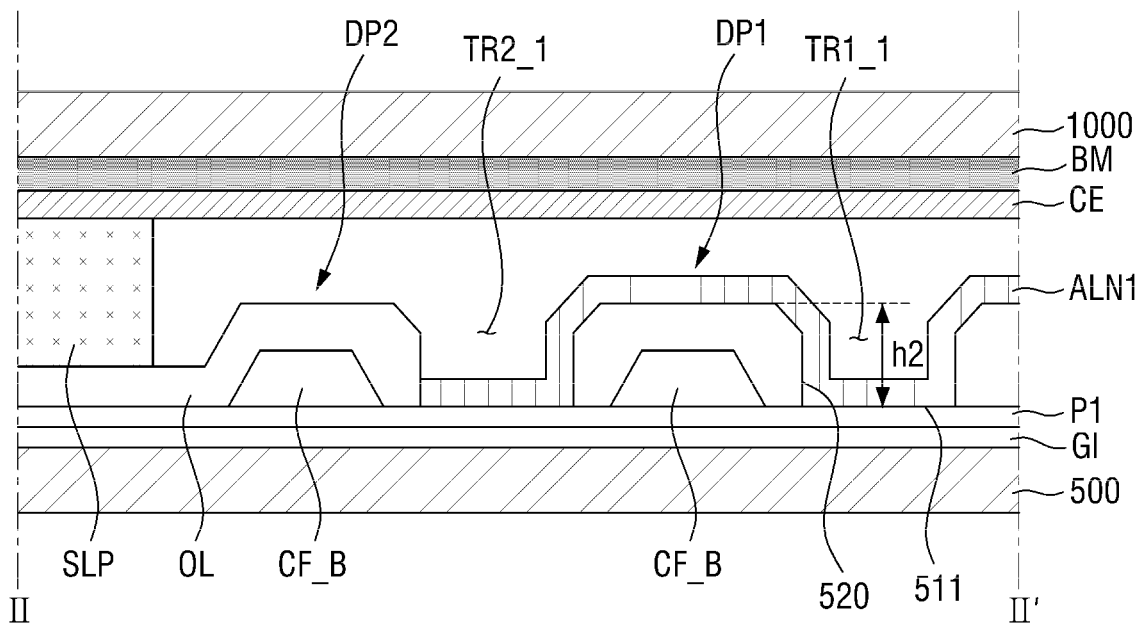
FIG. 4 is a cross-sectional view of a display device according to an exemplary embodiment of the present disclosure.

FIG. 4 is a cross-sectional view of a display device according to an exemplary embodiment of the present disclosure.

Referring to FIG. 4, in an exemplary embodiment, each of the first trench TR1_1 and/or the second trench TR_2_1 may include a bottom face 511 and a side wall 520 extending upward from the bottom face 511.

Unlike the exemplary embodiment shown in FIG. 3, the passivation layer P1 may work as the bottom face 511. That is to say, the bottom face 511 may be made of an inorganic insulating material.

Specifically, the first trench TR1_1 and/or the second trench TR_2_1 may penetrate through the organic layer OL to expose the passivation layer P1.

The sidewalls of the first trench TR1_1 and/or the second trench TR_2_1 may be formed with the organic layer OL as described above with reference to FIG. 3.

In this case, the first alignment layer ALN1 may come in contact with the bottom face 510 of the first trench TR1_1 or the bottom face 510 of the second trench TR2_1. That is to say, the first alignment layer ALN1 may come in contact with the passivation layer P1 exposed via the first trench TR1_1 and/or the second trench TR_2_1.

The first dam pattern DP1 and/or the second dam pattern DP2 may have a second height h2, separately from the first trench TR1_1 and/or the second trench TR_2_1. In an exemplary embodiment, the second height h2 may range from 3.6 μm to 5.2 μm.

The first trench TR1_1 and/or the second trench TR_2_1 can achieve substantially the same effects as those described above with reference to FIG. 3. That is to say, it is possible to prevent the first alignment layer ALN1 from being extended to the seal pattern SLP.

Figure 5:
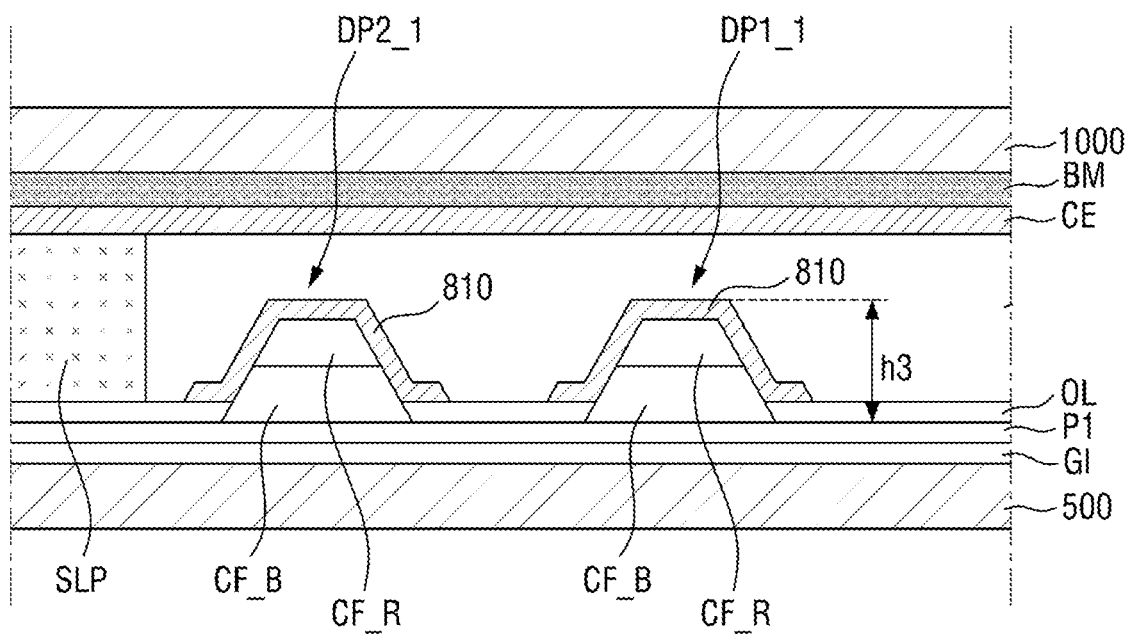
FIG. 5 is a cross-sectional view of a display device according to another exemplary embodiment of the present disclosure.

FIG. 5 is a cross-sectional view of a display device according to another exemplary embodiment of the present disclosure. Referring to FIG. 5, in an exemplary embodiment, each of a first dam pattern DP1_1 and/or a second dam pattern DP2_1 may include a first dummy color filter CF_B, a second dummy color filter CF_R, and a cover electrode 810.

In an exemplary embodiment, the second dummy color filter CF_R may be disposed on the first dummy color filter CF_B.

In an exemplary embodiment, the first dummy color filter CF_B may be a blue color filter, and the second dummy color filter CF_R may be a red color filter. It is, however, to be understood that the present disclosure is not limited thereto. The first dummy color filter CF_B and the second dummy color filter CF_R may have different colors, each of which may have one of blue, red and green colors.

The organic layer OL may be disposed on the passivation layer P1. Unlike the exemplary embodiment of FIG. 3, the organic layer OL may not fully cover the first dummy color filter CF_B and the second dummy color filter CF_R. Accordingly, the first dummy color filter CF_B and the second dummy color filter CF_R may penetrate through the organic layer OL to be exposed.

Further, according to this exemplary embodiment, the thickness of the organic layer OL may range from 0.9 μm to 1.1 μm.

A cover electrode 810 may be formed on the second dummy color filter CF_R. In an exemplary embodiment, the cover electrode 810 may be made of the same material as the pixel electrode PE in the display area DA. In an exemplary embodiment, the cover electrode 810 may be made of a transparent conductor such as indium tin oxide (ITO) and indium zinc oxide (IZO), or a reflective conductor such as aluminum.

In an exemplary embodiment the cover electrode 810 may be formed via the process of forming the pixel electrode PE. It is, however, to be understood that the present disclosure is not limited thereto. The cover electrode 810 and the pixel electrode PE may be formed separately via different processes.

As the cover electrode 810 covers the first dummy color filter CF_B and the second dummy color filter CF_R, the cover electrode 810 may come in contact with the first dummy color filter CF_B and the second dummy color filter CF_R.

Each of the first dam pattern DP1_1 and/or the second dam pattern DP2_1 thus formed may include the first dummy color filter CF_B, the second dummy color filter CF_R, and the cover electrode 810. Each of the first dam pattern DP1_1 and/or the second dam pattern DP2_1 made up of the first dummy color filter CF_B, the second dummy color filter CF_R and the cover electrode 810 may have a third height h3. In an exemplary embodiment the third height h3 may range from 3.6 μm to 5.2 μm.

When the thickness of the organic layer OL ranges from 0.9 μm to 1.1 μm and the third height h3 ranges from 3.6 μm to 5.2 μm, a sufficient step for blocking the first alignment layer ALN1 can be formed. Thus, it is possible to prevent the first alignment layer ALN1 from extending to the seal pattern SLP beyond the first dam pattern DP1_1 and/or the second dam pattern DP2_1.

Figure 6:
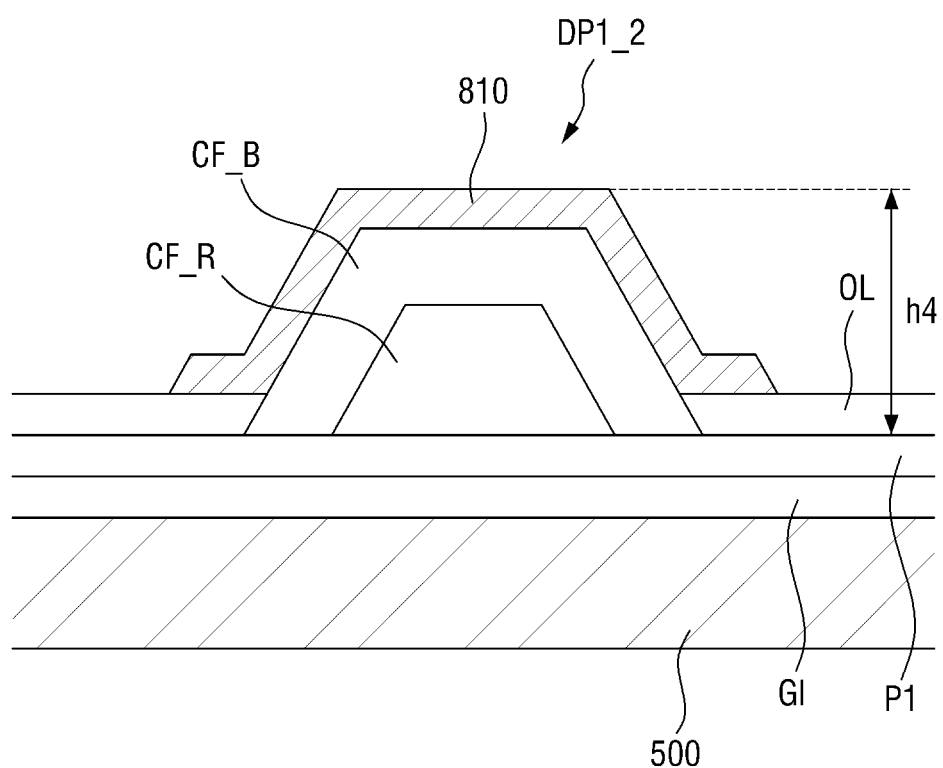
FIG. 6 is a cross-sectional view of a part of a display device according to an exemplary embodiment of the present disclosure.

FIG. 6 is a cross-sectional view of a part of a display device according to an exemplary embodiment of the present disclosure.

Referring to FIG. 6, the first dummy pattern DP1_2 may be formed by stacking a second dummy color filter CF_R, a first dummy color filter CF_B, and a cover electrode 810 in this order.

In an exemplary embodiment, the second dummy color filter CF_R may be a red color filter, and the first dummy color filter CF_B may be a blue color filter. It is, however, to be understood that the present disclosure is not limited thereto. The first dummy color filter CF_B and the second dummy color filter CF_R may have different colors, each of which may have one of blue, red and green colors.

The first dummy color filter CF_B may fully cover the second dummy color filter CF_R. Specifically, the first dummy color filter CF_B may fully the upper surface and the side surfaces of the second dummy color filter CF_R.

Accordingly, the second dummy color filter CF_R may not be in contact with the organic layer OL.

The cover electrode 810 may fully cover the first dummy color filter CF_B.

Unlike the exemplary embodiment shown in FIG. 5, the first dummy color filter CF_B fully covers the second dummy color filter CF_R, and thus the cover electrode 810 comes in contact with the first dummy color filter CF_B but not with the second dummy color filter CF_R.

In an exemplary embodiment, the first dam pattern DP1_2 may have a fourth height h4. In an exemplary embodiment, the fourth height h4 may range from 3.7 μm to 3.9 μm.

Figure 7:
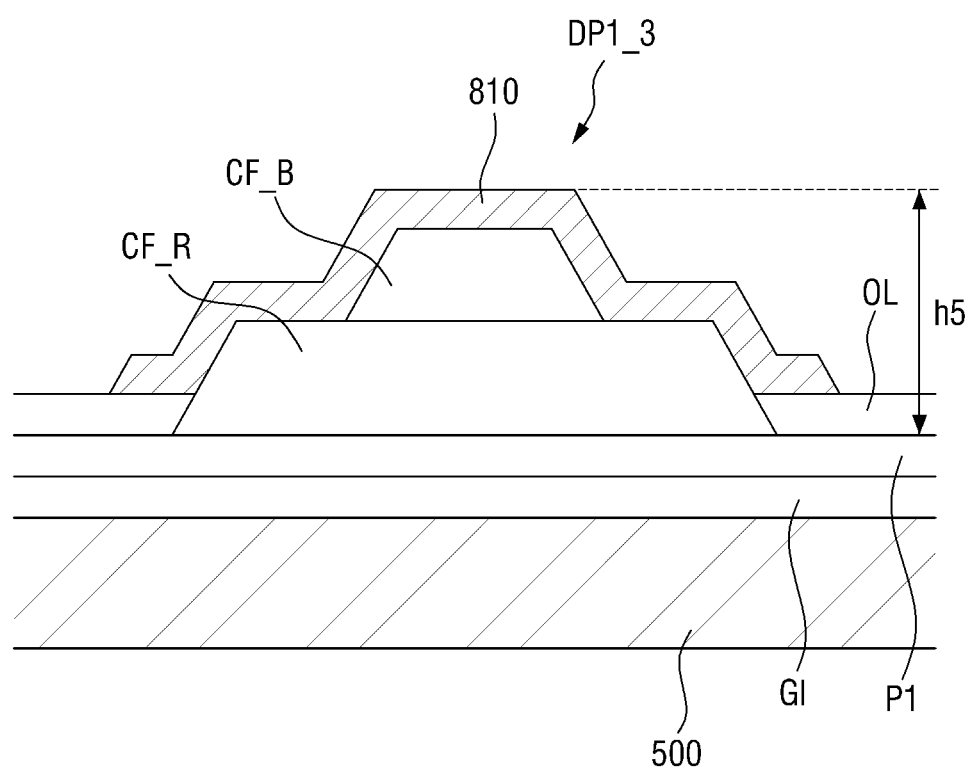
FIG. 7 is a cross-sectional view of a part of a display device according to an exemplary embodiment of the present disclosure.

FIG. 7 is a cross-sectional view of a part of a display device according to an exemplary embodiment of the present disclosure.

Referring to FIG. 7, the first dummy pattern DP1_3 may include a second dummy color filter CF_R, a first dummy color filter CF_B, and a cover electrode 810.

In an exemplary embodiment, a first dummy color filter CF_B may be disposed on the second dummy color filter CF_R.

The first dummy color filter CF_B may partially cover the second dummy color filter CF_R.

Accordingly, some portion of the second dummy color filter CF_R may overlap with the first dummy color filter CF_B, and the other portion of the second dummy color filter CF_R may not overlap with the first dummy color filter CF_B.

Accordingly, a step may be formed between the upper surface of the first dummy color filter CF_B and a portion of the upper surface of the second dummy color filter CF_R.

The cover electrode 810 may cover the first dummy color filter CF_B and the second dummy color filter CF_R. Specifically, the cover electrode fully covers the first dummy color filter CF_B and may come in contact with the portion of the second dummy color filter CF_R that does not overlap with the first dummy color filter CF_B.

In an exemplary embodiment, the first dam pattern DP1_3 may have a fifth height h5. In an exemplary embodiment, the fifth height h5 may range from 3.7 μm to 3.9 μm.

When the first dam pattern DP1_3 has the step as described above, it is possible to more efficiently suppress the first alignment layer ALN1 from extending.

Figure 8:
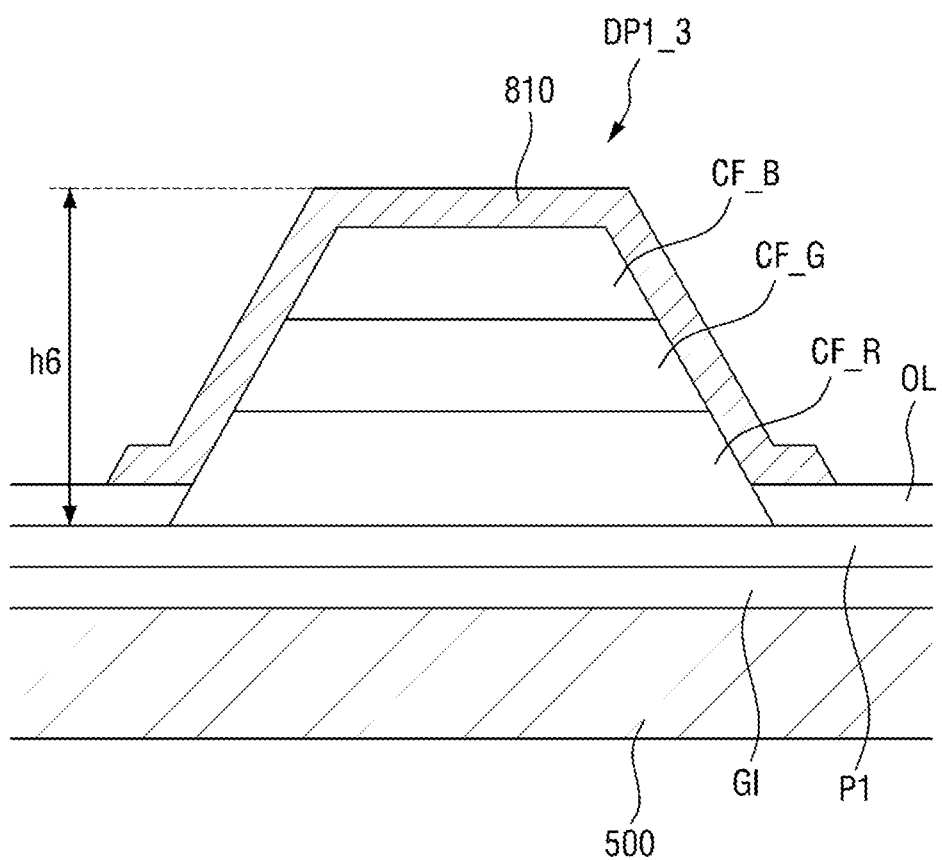
FIG. 8 is a cross-sectional view of a part of a display device according to another exemplary embodiment of the present disclosure.

FIG. 8 is a cross-sectional view of a part of a display device according to another exemplary embodiment of the present disclosure.

Referring to FIG. 8, in an exemplary embodiment, a first dam pattern DP1_3 may include a second dummy color filter CF_R, a third dummy color filter CF_G, a first dummy color filter CF_B and a cover electrode 810 stacked on one another in this order.

In an exemplary embodiment, the first dummy color filter CF_B may be a blue color filter, the second dummy color filter CF_R may be a red color filter, and the third dummy color filter CF_G may be a green color filter. It is, however, to be understood that the present disclosure is not limited thereto. The first dummy color filter CF_B, the second dummy color filter CF_R and the third dummy color filter CF_G may have different colors, each of which may have one of blue, red and green colors.

The second dummy color filter CF_R, the third dummy color filter CF_G and the first dummy color filter CF_B are stacked on one another in this order. The side walls of the second dummy color filter CF_R, the third dummy color filter CF_G, and the first dummy color filter CF_B may be aligned with one another.

As the side walls of the second dummy color filter CF_R, the third dummy color filter CF_G, and the first dummy color filter CF_B are aligned with one another, the cover electrode 810 covering the second dummy color filter CF_R, the third dummy color filter CF_G and the first dummy color filter CF_B may come in contact with the second dummy color filter CF_R, the third dummy color filter CF_G and the first dummy color filter CF_B.

In an exemplary embodiment, the first dam pattern DP1_3 may have a sixth height h6.

In an exemplary embodiment, the sixth height h6 may range from 5.0 μm to 5.2 μm.

Figure 9:
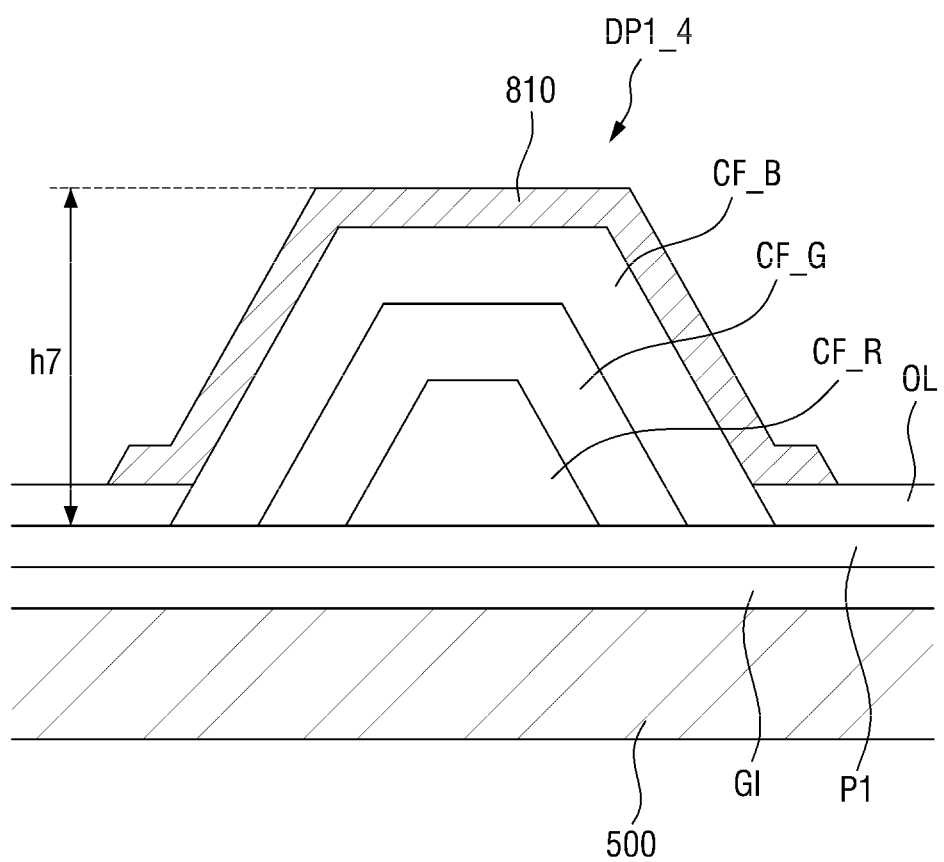
FIG. 9 is a cross-sectional view of a part of a display device according to another exemplary embodiment of the present disclosure.

FIG. 9 is a cross-sectional view of a part of a display device according to another exemplary embodiment of the present disclosure. Referring to FIG. 9, a first dam pattern DPi_4 may include a second dummy color filter CF_R, a third dummy color filter CF_G, a first dummy color filter CF_B and a cover electrode 810 stacked on one another in this order.

In an exemplary embodiment, the first dummy color filter CF_B may be a blue color filter, the second dummy color filter CF_R may be a red color filter, and the third dummy color filter CF_G may be a green color filter. It is, however, to be understood that the present disclosure is not limited thereto. The first dummy color filter CF_B, the second dummy color filter CF_R and the third dummy color filter CF_G may have different colors, each of which may have one of blue, red and green colors.

In an exemplary embodiment, the second dummy color filter CF_R may be fully covered by the third dummy color filter CF_G, and the third dummy color filter CF_G may be fully covered by the first dummy color filter CF_B.

Accordingly, the cover electrode 810 covering the first dummy color filter CF_B is in contact with the first dummy color filter CF_B but neither with the second dummy color filter CF_R nor with the third dummy color filter CF_G.

In an exemplary embodiment, the first dam pattern DP1_4 may have a seventh height h7. In an exemplary embodiment, the seventh height may range from 5.0 μm to 5.2 μm.

Figure 10:
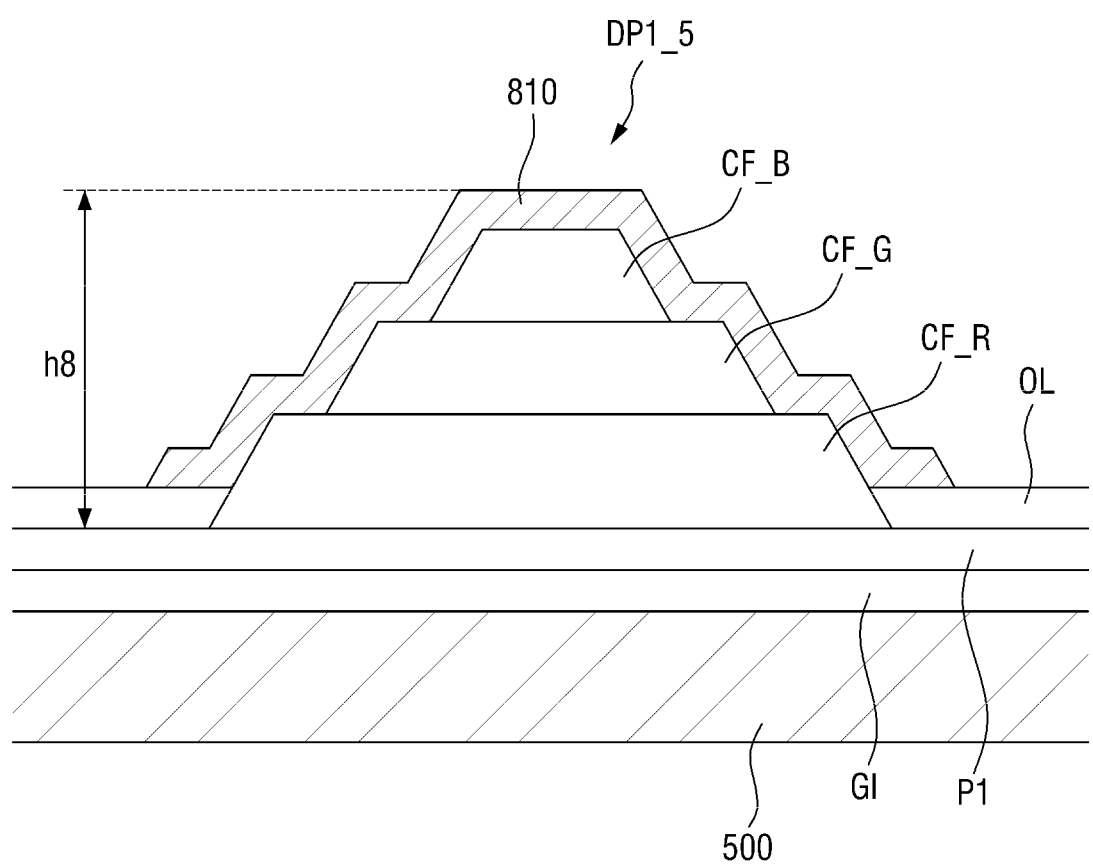
FIG. 10 is a cross-sectional view of a part of a display device according to another exemplary embodiment of the present disclosure.

FIG. 10 is a cross-sectional view of a part of a display device according to another exemplary embodiment of the present disclosure.

Referring to FIG. 10, in an exemplary embodiment, a first dam pattern DPi_5 may include a second dummy color filter CF_R, a third dummy color filter CF_G, a first dummy color filter CF_B and a cover electrode 810 stacked on one another in this order.

In an exemplary embodiment, the first dummy color filter CF_B may be a blue color filter, the second dummy color filter CF_R may be a red color filter, and the third dummy color filter CF_G may be a green color filter. It is, however, to be understood that the present disclosure is not limited thereto. The first dummy color filter CF_B, the second dummy color filter CF_R and the third dummy color filter CF_G may have different colors, each of which may have one of blue, red and green colors.

The third dummy color filter CF_G may partially cover the second dummy color filter CF_R, and the first dummy color filter CF_B may partially cover the third dummy color filter CF_G. Accordingly, a step may be formed between the first dummy color filter CF_B and a portion of the upper surface of the third dummy color filter CF_G (the portion not overlapping with the first dummy color filter CF_B).

Likewise, a step may be formed between the upper surface of the third dummy color filter CF_G and a portion of the upper surface of the second dummy color filter CF_R (the portion not overlapping with the third dummy color filter CF_G).

The cover electrode 810 may cover the second dummy color filter CF_R, the third dummy color filter CF_G and the first dummy color filter CF_B, and may come in contact with the second dummy color filter CF_R, the third dummy color filter CF_G and the first dummy color filter CF_B.

In an exemplary embodiment, the first dam pattern DP1_5 may have an eighth height h8. In an exemplary embodiment, the eighth height h8 may range from 5.0 μm to 5.2 μm.

When the first dam pattern DPi_5 has the step as described above, it is possible to more efficiently suppress the first alignment layer ALN1 from extending.

Although FIGS. 6 to 10 illustrate the first dam pattern, the first dam pattern and the second dam pattern may have substantially the same shape, as mentioned earlier. That is to say, like the first dam pattern, the second dam pattern may have substantially the same shape as one of the first dam patterns described above with reference to FIGS. 6 to 10.

Hereinafter, a method for manufacturing a display device according to an exemplary embodiment of the present disclosure will be described.

Hereinafter, a method for manufacturing a display device according to some exemplary embodiments of the present disclosure will be described. Some of elements described below may be identical to those of the liquid-crystal display described above with respect to the some exemplary embodiments of the present disclosure; and, therefore, description thereof may be omitted to avoid redundancy.

FIGS. 11 to 14 are cross-sectional views for illustrating a method for manufacturing a display device according to an exemplary embodiment of the present disclosure.

Referring to FIGS. 11 to 14, a method for manufacturing a display device according to an exemplary embodiment of the present disclosure includes preparing a first substrate 500 including a gate insulating layer GI and a passivation layer P1 and having a display area and a non-display area defined thereon; and forming a first dam pattern DP1 and a second dam pattern DP2 on the passivation layer P1 in the non-display area NDA.

Figure 11:
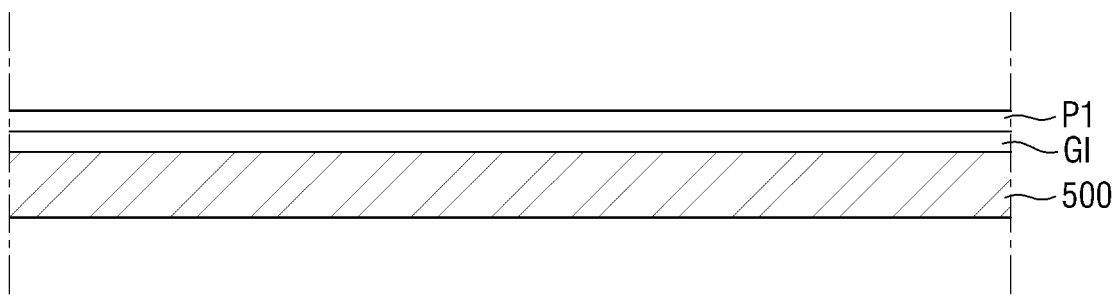
FIGS. 11, 12, 13, and 14 are cross-sectional views for illustrating a method for manufacturing a display device according to an exemplary embodiment of the present disclosure.

Initially, referring to FIG. 11, the method may include preparing a first substrate 500 having a gate insulating layer GI and a passivation layer P1 formed thereon and defining a display area and a non-display area thereon. The first substrate 500, the gate insulating layer GI and the passivation layer P1 may be substantially identical to those of the display device according to the above-described some embodiments of the present disclosure. Therefore, a detailed description thereon will be omitted.

Figure 12:
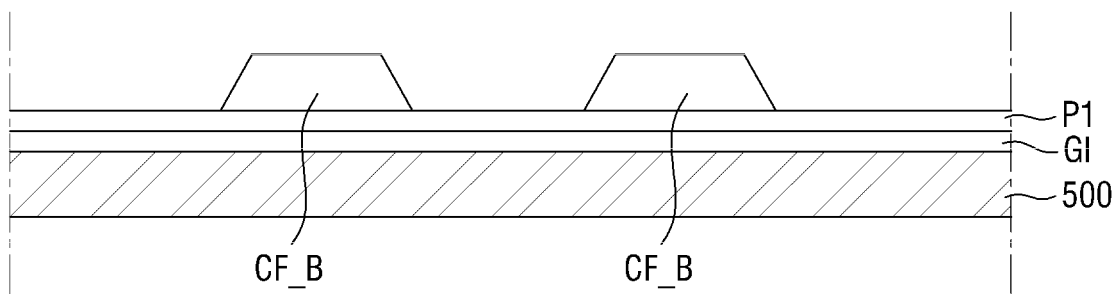

Referring to FIG. 12, the method may include forming a first dam pattern DP1 and a second dam pattern DP2 on the passivation layer P1 in the non-display area NDA.

The first dam pattern DP1 and the second dam pattern DP2 may be substantially identical to those of the display device according to the above-described some embodiments of the present disclosure.

In an exemplary embodiment, the forming the first dam pattern DP1 and the second dam pattern DP2 may include forming first dummy color filters CF_B and forming an organic layer covering the first dummy color filters CF_B.

FIG. 12 illustrates forming the first dummy color filters CF_B. Referring to FIG. 12, the first dummy color filters CF_B may be disposed apart from one another. Since the first dummy color filters CF_B form the first dam pattern DP1 and the second dam pattern DP2, they may be formed such that they surround the edges of the display area DA, like the first dam pattern DP1 and the second dam pattern DP2 shown in FIG. 1.

Figure 13:
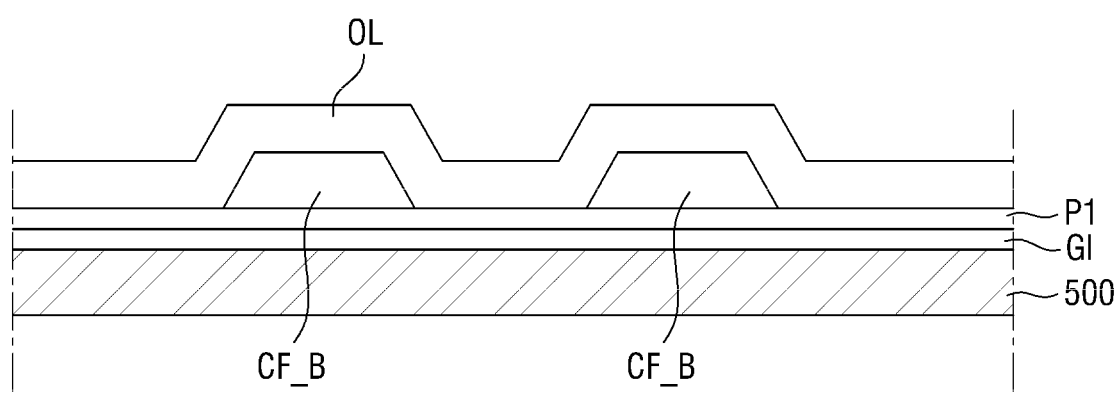

Subsequently, FIG. 13 illustrates forming an organic layer OL covering the first dummy color filters CF_B. In an exemplary embodiment, the organic layer OL may be made of an organic material having photosensitivity.

In an exemplary embodiment, the first dam pattern DP1 and the second dam pattern DP2 may be substantially identical to those described above with reference to FIG. 3. That is to say, each of the first dam pattern DP1 and/or the second dam pattern DP2 may include the first dummy color filter CF_B and the organic layer OL.

According to an exemplary embodiment of the present disclosure, the method for manufacturing a display device may further include recessing the organic layer OL to form a first trench TR_1 and/or a second trench TR_2.

Figure 14:
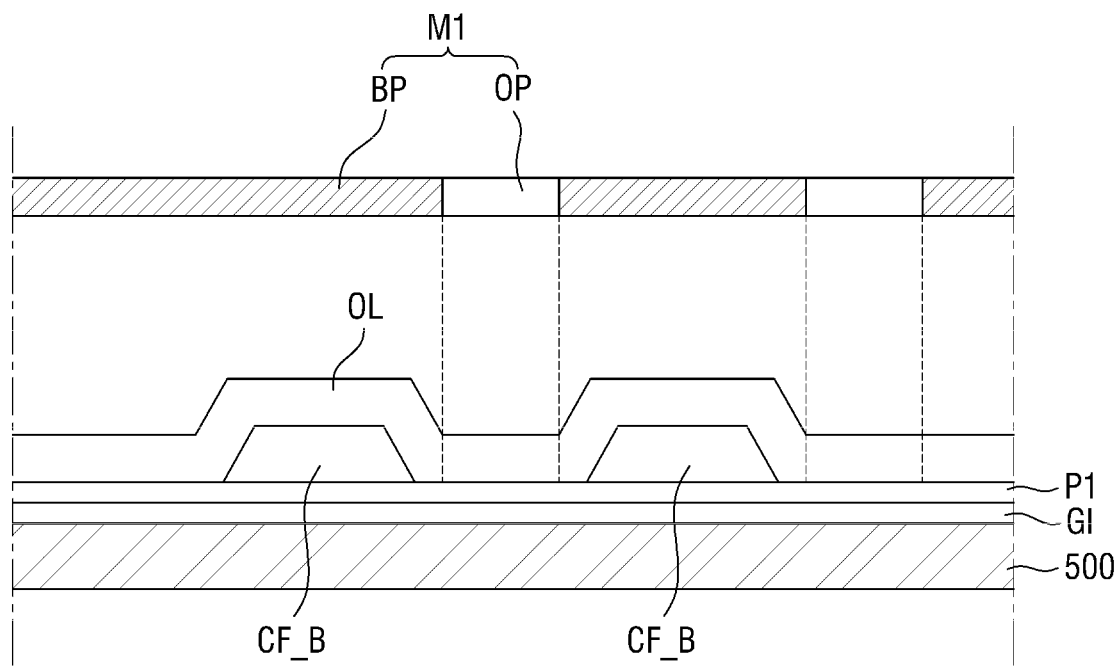

Referring to FIG. 14, the recessing the organic layer OL to form the first trench TR_1 and/or the second trench TR_2 may be performed by using a photomask M1 having a light-blocking portion BP and an open portion OP.

The light-blocking portion BP may not transmit light, whereas the open portion OP may transmit light completely or partially.

When the organic layer OL is irradiated with UV using the photomask M1, a part of the organic layer OL under the light-blocking portion BP remains whereas a part of the organic layer OL under the open portion OP may be removed completely or partially. That is to say, the first trench TR1 and/or the second trench TR2 described above with reference to FIG. 3 or 4 may be formed in the organic layer OL under the open portion OP.

When the open portion OP can transmit light completely, the first trench TR1 and/or the second trench TR2 may be formed such that they completely penetrate the organic layer OL, as shown in FIG. 4.

Alternatively, when the open portion OP can transmit light partially, i.e., when the photomask is a halftone or slit mask, the first trench TR1 and/or the second trench TR2 may have the bottom face 510 formed with the organic layer OL which may have a smaller thickness, as shown in FIG. 3.

Subsequently, the method for manufacturing a display device according to an exemplary embodiment of the present disclosure may further include applying a first alignment layer ALN1 onto a first substrate 500, and attaching the first substrate 500 and the second substrate 1000 together by using a seal pattern SLP.

The first alignment layer ALN1 may be formed by inkjet printing or nozzle printing. The composition and the shape of the first alignment layer ALN1 may be substantially identical to those of the display device according to the above-described some exemplary embodiments of the present disclosure.

Subsequently, the method may include attaching the first substrate 500 and the second substrate 1000 together by using the seal pattern SLP. The first substrate 500 and the second substrate 1000 may be attached together by the seal pattern SLP interposed therebetween. The shape or structure of the seal pattern SLP may be substantially identical to that of the display device according to the above-described some exemplary embodiments of the present disclosure.

Next, a method for manufacturing a display device according to another exemplary embodiment of the present disclosure will be described.

According to another exemplary embodiment of the present disclosure, forming a first dam pattern DP1 and a second dam pattern DP2 on a passivation layer P1 in the non-display area NDA may include stacking at least two dummy color filters, forming an organic layer OL on the stack of dummy color filters, etching the organic layer OL, and forming a cover electrode 810 on the stack of dummy color filters.

FIGS. 15 to 18 are cross-sectional views for illustrating a method for manufacturing a display device according to an exemplary embodiment of the present disclosure.

Figure 15:
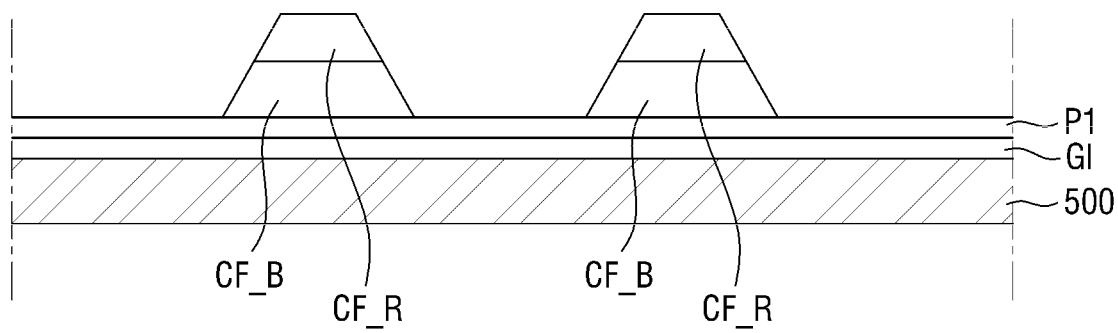
FIGS. 15, 16, 17, and 18 are cross-sectional views for illustrating a method for manufacturing a display device according to an exemplary embodiment of the present disclosure.

Referring to FIG. 15, the method may include stacking a second dummy color filter CF_R on a first dummy color filter CF_B. Although FIG. 15 illustrates that the second dummy color filter CF_R is stacked on the first dummy color filter CF_B as an example, the stack of dummy color filters is not limited thereto. That is to say, the stack of dummy color filters may be one of the stacks of dummy color filters described above with reference to FIGS. 5 to 10.

Figure 16:
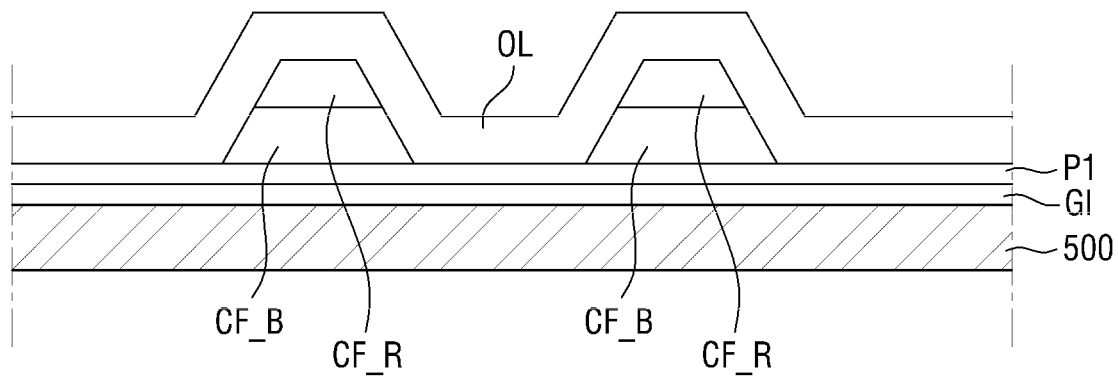

Subsequently, FIG. 16 illustrates forming an organic layer OL on the stack of dummy color filters. In an exemplary embodiment, the organic layer OL may be made of an organic material having photosensitivity.

Figure 17:
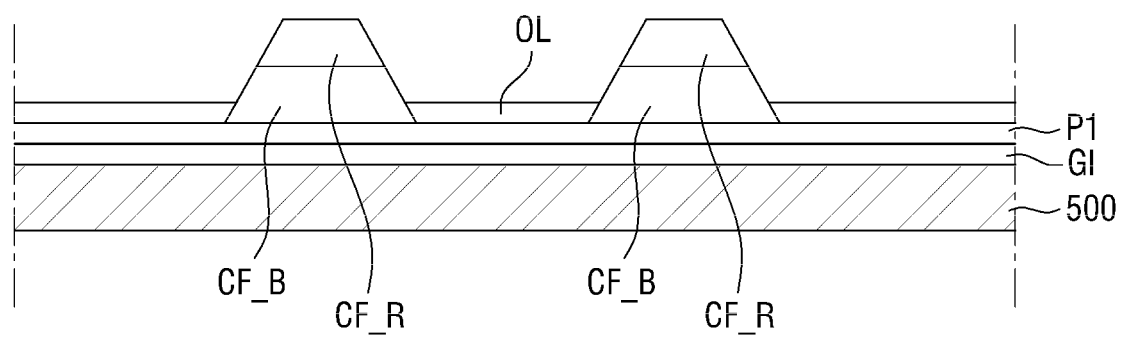

Subsequently, FIG. 17 illustrates etching the organic layer OL. The etching the organic layer OL may be performed by using the open portion OP of the above-described photo mask M1.

As shown in FIG. 17, the organic layer OL may be etched so that it does not cover the stack of dummy color filters.

Figure 18:
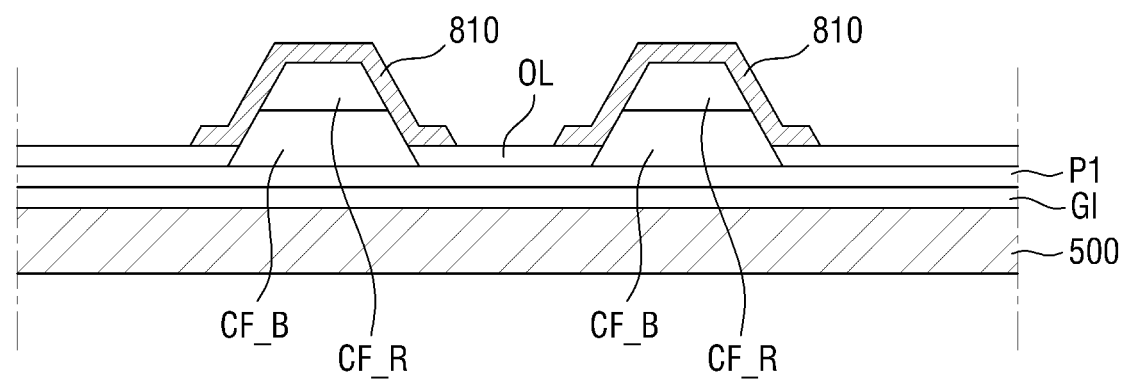

Subsequently, FIG. 18 illustrates forming a cover electrode 810 on the stack of dummy color filters. In an exemplary embodiment, the cover electrode 810 may be formed by applying a conductive layer throughout the entire surface of the non-display area NDA and then etching it away.

That is to say, the cover electrode 810 may cover the stack of dummy color filters, leaving the rest of the area uncovered.

The method for manufacturing a display device according to this exemplary embodiment of the present disclosure may further include applying a first alignment layer ALN1 onto a first substrate 500, and attaching the first substrate 500 and the second substrate 1000 together by using a seal pattern SLP. The operations are substantially identical to those described above; and, therefore, the redundant description will be omitted.

Although the preferred embodiments of the present inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. A display device comprising:
   a display panel having a display area and a non-display area disposed outside the display area, the display panel comprising a first substrate and a second substrate;
   a seal pattern disposed around the non-display area and attaching the first substrate and the second substrate together;
   a first dam pattern disposed between the seal pattern and the display area and having a first height;
   a second dam pattern disposed between the first dam pattern and the seal pattern;
   an organic layer covering the non-display area at least partially; and
   a first alignment layer disposed on the organic layer,
   wherein the first height ranges from 3.6 μm to 5.2 μm.

2. The display device of claim 1, further comprising: a first trench formed between the first dam pattern and the display area and having a bottom face and side walls extended upward from the bottom face.

3. The display device of claim 2, wherein the side walls and the bottom face are formed with the organic layer.

4. The display device of claim 3, wherein the first dam pattern comprises a first dummy color pattern and the organic layer covering the first dummy color pattern, and wherein a thickness of a portion of the organic layer as the bottom face is different from a thickness of a portion of the organic layer covering the first dummy color pattern.

5. The display device of claim 2, wherein the side walls are formed with the organic layer, while the bottom face is made of an inorganic insulating material.

6. The display device of claim 5, wherein the first alignment layer comes in contact with the bottom face.

7. The display device of claim 2, further comprising: a second trench formed between the first dam pattern and the second dam pattern.

8. The display device of claim 1, wherein the first dam pattern comprises at least one dummy color filter.

9. The display device of claim 1, wherein the first dam pattern further comprises a stack of dummy color filters having different colors, and a cover electrode covering the dummy color filters.

10. The display device of claim 9, wherein the first dam pattern comprises a first dummy color filter and a second dummy color filter that have different colors, and wherein the first height ranges from 3.7 μm to 3.9 μm.

11. The display device of claim 10, wherein the first dam pattern further comprises a third dummy color filter having a different color from the colors of the first dummy color filter and the second dummy color filter and stacked thereon, and wherein the first height ranges from 5.0 μm to 5.2 μm.

12. The display device of claim 9, wherein the dummy color filters are stacked on one another in a stepwise fashion and have a step difference.

13. A method for manufacturing a display device, the method comprising:

preparing a first substrate defining thereon a display area and a non-display area disposed outside the display area, the first substrate comprising a gate insulating layer and a passivation layer;

forming a first dam pattern and a second dam pattern in the non-display area;

forming an organic layer in the non-display area;

forming a first alignment layer on the organic layer; and attaching the first substrate and a second substrate facing the first substrate together by using a seal pattern, wherein the first dam pattern has a first height, and the first height ranges from 3.6 μm to 5.2 μm.

14. The method of claim 13, further comprising: forming a first trench between the first dam pattern and the display area.

15. The method of claim 14, wherein the forming the first trench comprises etching the organic layer using a photomask having an open portion and a light-blocking portion.

16. The method of claim 14, wherein the first trench further comprises a bottom face and side walls extended upward from the bottom face, wherein the first dam pattern comprises a first dummy color filter and the organic layer covering the first dummy color filter, and wherein a thickness of a portion of the organic layer as the bottom face is different from a thickness of a portion of the organic layer covering the first dummy color pattern.

17. The method of claim 13, wherein the forming the first dam pattern and the second dam pattern in the non-display area comprises: stacking two or more dummy color filters; and forming a cover electrode on the stack of dummy color filters.

18. The method of claim 17, wherein the first dam pattern comprises a first dummy color filter and a second dummy color filter that have different colors, and wherein the first height ranges from 3.7 μm to 3.9 μm.

19. The method of claim 18, wherein the first dam pattern further comprises a third dummy color filter having a different color from the colors of the first dummy color filter and the second dummy color filter and stacked thereon, and wherein the first height ranges from 5.0 μm to 5.2 μm.

20. The method of claim 17, wherein the dummy color filters are stacked on one another in a stepwise fashion and have a step difference.

* * * * *